United States Patent Office 3,483,260
Patented Dec. 9, 1969

3,483,260
TETRAKIS - HYDROXYBENZYL PHOSPHONIUM HALIDES AND THE PREPARATION THEREOF
Calvin J. Worrel, Detroit, Mich., assignor to Ethyl Corporation, New York, N.Y., a corporation of Virginia
No Drawing. Filed Oct. 27, 1967, Ser. No. 678,511
Int. Cl. C07f 9/54; C08k 1/60; C10m 1/44
U.S. Cl. 260—606.5
12 Claims

ABSTRACT OF THE DISCLOSURE

Tetrakis-hydroxybenzyl phosphonium halides are made by reacting a hydroxybenzyl halide with one of the following: (1) tetrakis-hydroxyalkyl phosphonium halide, (2) tris-hydroxyalkyl phosphine oxide, or (3) tris-hydroxyalkyl phosphine. The compounds are antioxidants either alone or in combination with a dialkylthiodialkanoate synergist.

BACKGROUND

Most organic materials undergo degradation to some extent in the presence of oxygen. This degradation is accelerated at increased temperatures. Frequently, high temperatures are encountered during the processing of materials during manufacture and, thus, some form of stabilizer is required. For example, polypropylene is generally heated to its melting point during such operations as extruding or molding of the material into its finished form. During these operations, polypropylene is extremely susceptible to degradation. Also, newer uses of polypropylene, especially in fabrics, exposes the material to conditions never previously encountered such as high surface area exposure, dry-cleaning and laundering. Antioxidants which in the past have served quite effectively to stabilize a broad range of organic materials are no longer satisfactory for use in many modern plastic applications.

SUMMARY

This invention relates to new antioxidants that impart exceptional stability to a broad range of organic materials. In particular this invention relates to tetrakis-hydroxybenzyl phosphonium halides and to their use as antioxidants.

An object of this invention is to provide new antioxidant compounds and several methods of preparing them. A further object is to provide a means of stabilizing organic material normally susceptible to degradation in the presence of oxygen. A still further object is to provide polypropylene compositions that are exceptionally stable even at elevated temperatures.

DESCRIPTION OF THE PREFERRED EMBODIMENTS

The objects of this invention are accomplished by providing tetrakis-hydroxybenzyl phosphonium halides having the formula:

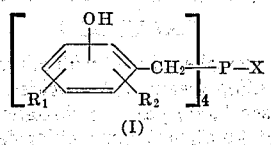

(I)

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals, $C_{7-12}$ aralkyl radicals, and X is a halogen having an atomic number from 17–53. Examples of these compounds are:

tetrakis(3-tert-butyl-5-methyl-2-hydroxybenzyl)phosphonium bromide
tetrakis(4-hydroxybenzyl)phosphonium chloride
tetrakis(2-methyl-5-tert-butyl-4-hydroxybenzyl)phosphonium iodide
tetrakis(3,5-dimethyl-4-hydroxybenzyl)phosphonium chloride
tetrakis[3-sec-dodecyl-5(α-methylbenzyl)-4-hydroxybenzyl]phosphonium bromide
tetrakis(5-phenyl-2-hydroxybenzyl)phosphonium iodide
tetrakis(2-methyl-5-sec-butyl-4-hydroxybenzyl)phosphonium chloride
tetrakis(3-tert-amyl-5-cyclohexyl-4-hydroxybenzyl)phosphonium chloride
tetrakis(3-sec-decyl-5-benzyl-4-hydroxybenzyl)phosphonium chloride
tetrakis(3-methyl-4-hydroxybenzyl)phosphonium bromide In one preferred embodiment, the tetrakis-hydroxybenzyl phosphonium halides have the hydroxy radical on the benzyl group located in the -4- position. These compounds have the formula:

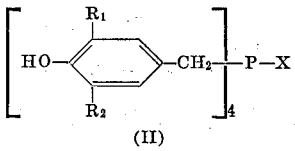

(II)

wherein $R_1$, $R_2$ and X are the same as in Formula I. Some examples of these compounds in addition to those previously listed are:

tetrakis(3-tert-butyl-4-hydroxybenzyl)phosphonium chloride
tetrakis(3-methyl-5-tert-butyl-4-hydroxybenzyl)phosphonium bromide
tetrakis[3-methyl-5(α,α-dimethylbenzyl)-4-hydroxybenzyl]phosphonium iodide
tetrakis(3-methyl-5-sec-butyl-4-hydroxybenzyl)phosphonium chloride
tetrakis(3-methyl-5-isopropyl-4-hydroxybenzyl)phosphonium chloride
tetrakis(3-sec-dodecyl-4-hydroxybenzyl)phosphonium chloride In a more preferred embodiment the tetrakis-hydroxybenzyl halides have the formula:

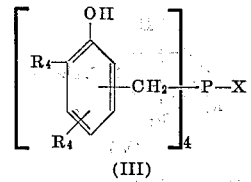

(III)

wherein $R_1$ and X are the same as in Formula I and $R_4$ is selected from the group consisting of alpha-branched $C_{3-12}$ alkyl radicals, alpha-branched $C_{8-12}$ aralkyl radicals and $C_{6-12}$ cycloalkyl radicals. These compounds are distinguished from the broad class of tetrakis-hydroxybenzyl phosphonium halides by the fact that the hydroxyl radical on the benzyl group is sterically hindered by at least one secondary or tertiary radical ortho to the hydroxyl radical. These compounds are exemplified by:

tetrakis(3-methyl-5-tert-butyl-4-hydroxybenzyl)phosphonium chloride
tetrakis(3-cyclohexyl-2-hydroxybenzyl)phosphonium bromide
tetrakis[3-(α-methylbenzyl)-5-methyl-2-hydroxybenzyl]phosphonium chloride
tetrakis(2-methyl-5-cyclohexyl-4-hydroxybenzyl)phosphonium bromide In a highly preferred embodiment of the new compounds the hydroxyl radical is located in the para position on the benzyl group and both positions ortho to the hydroxyl radical are substituted. In this embodiment, the new compounds have the formula:

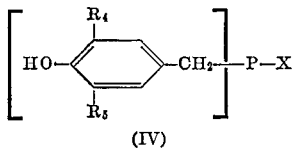

(IV)

wherein $R_4$ and X are the same as in Formula III and $R_5$ is selected from the group consisting of $C_{1-12}$ alkyl radicals, $C_{6-12}$ cycloalkyl radicals and $C_{6-12}$ aralkyl radicals. Examples of these compounds are:

tetrakis[3-tert-butyl-5-($\alpha$-methylbenzyl)-4-hydroxybenzyl]phosphonium bromide
tetrakis(3,5-diisopropyl-4-hydroxybenzyl)phosphonium iodide
tetrakis(3,5-di-sec-butyl-4-hydroxybenzyl)phosphonium chloride
tetrakis[3,5-di($\alpha$-methylbenzyl)-4-hydroxybenzyl]phosphonium chloride
tetrakis(3,5-dicyclohexyl-4-hydroxybenzyl)phosphonium bromide
tetrakis(3,5-di-sec-dodecyl-4-hydroxybenzyl)phosphonium bromide
tetrakis(3-tert-butyl-5-benzyl-4-hydroxybenzyl)phosphonium iodide
tetrakis(3,5-di-tert-octyl-4-hydroxybenzyl)phosphonium chloride
tetrakis(3,5-di-tert-amyl-4-hydroxybenzyl)phosphonium chloride The most preferred new compound is tetrakis(3,5-di-tert-butyl-4-hydroxybenzyl)phosphonium chloride.

The new compounds can be made by several methods. The first method is the reaction of a hydroxybenzyl halide with a tetrakis-hydroxyalkyl phosphonium halide. Both types of reactants are known. For example, useful hydroxybenzyl halides are described in J. Am. Chem. Soc., 77, 1783–5 (1955), and in U.S. Patent 3,257,321 (June 21, 1966). The tetrakis-hydroxyalkyl phosphonium halides are described by E. L. Gefter, "Oragno Phosphorus Monomers and Polymers," pp. 102–3, Associated Technical Services, Inc., Glenridge, N.J. (1962), and by G. M. Kosolopoff, "Organo Phosphorus Compounds," pp. 81–7, John Wiley and Sons, N.Y. (1950).

Suitable hydroxybenzyl halides are those having the formula:

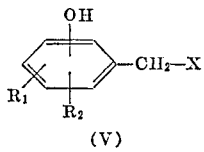

(V)

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals and $C_{7-12}$ aralkyl radicals, and X is a halogen having an atomic number from 17–53; namely, chlorine, bromine or iodine.

Examples of these hydroxybenzyl halides are:

3-tert-butyl-4-hydroxybenzyl chloride
3-methyl-5-tert-butyl-2-hydroxybenzyl bromide
2-hydroxybenzyl iodide
3-phenyl-5-methyl-2-hydroxybenzyl bromide
3,5-dicyclohexyl-2-hydroxybenzyl chloride
3-methyl-5-($\alpha$-methylbenzyl)-2-hydroxybenzyl chloride
2-methyl-5-tert-butyl-4-hydroxybenzyl chloride
4-hydroxybenzyl bromide
2-methyl-5-phenyl-4-hydroxybenzyl iodide
3-cyclohexyl-4-hydroxybenzyl chloride
2-methyl-5-($\alpha$-methylbenzyl)-4-hydroxybenzyl bromide
3-sec-dodecyl-4-hydroxybenzyl chloride
3,5-dimethyl-4-hydroxybenzyl bromide
2-tert-butyl-5-($\alpha$,$\alpha$-dimethylbenzyl)-4-hydroxybenzyl iodide
3-(4-tert-butylphenyl)-4-hydroxybenzyl chloride In making the most preferred tetrakis(3,5-di-tert-butyl-4-hydroxybenzyl)phosphonium chloride the hydroxybenzyl halide reactant is 3,5-di-tert-butyl-4-hydroxybenzyl chloride.

The tetrakis-hydroxyalkyl phosphonium halide reactants have the formula:

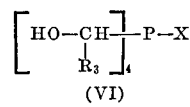

(VI)

wherein $R_3$ is selected from the group consisting of hydrogen and $C_{1-6}$ alkyl radicals. Examples of these are:

tetrakis-hydroxymethyl phosphonium chloride
tetrakis-hydroxymethyl phosphonium bromide
tetrakis(1-hydroxyethyl)phosphonium chloride
tetrakis(1-hydroxypropyl)phosphonium iodide
tetrakis(1-hydroxybutyl)phosphonium chloride
tetrakis(1-hydroxyheptyl)phosphonium bromide The reaction is carried out by merely mixing the reactants in a suitable vessel. Stoichiometry requires about 4 moles of the hydroxybenzyl halide reactant per mole of the tetrakis-hydroxyalkyl phosphonium halide, but generally an excess is employed. In practice, the use of about 4–6 moles of hydroxybenzyl halide per mole of tetrakis-hydroxyalkyl phosphonium halide gives satisfactory results.

It is generally preferred to conduct the reaction in a solvent. Useful solvents are those that are substantially inert to the reactants and have some solvent effect. These include hydrocarbons, chlorinated hydrocarbons, ethers, and the like. Suitable hydrocarbons include both aliphatics and aromatics. Examples of aliphatic hydrocarbons are hexane, heptane, isooctane, n-nonane, and the like. Typical aromatic solvents are benzene, toluene, xylene, and the like.

Useful ethers are diethyl ether, tetrahydrofuran, dioxane, ethyleneglycol dimethyl ether, diethyleneglycol dimethyl ether, and the like. Examples of chlorinated hydrocarbons are methylene chloride, chloroform, carbon tetrachloride, 1,1,1-trichloroethane, 1,1,2-trichloroethane, and the like.

Hydrogen halide is evolved during the reaction. For this reason, it is generally preferred to have a hydrogen halide acceptor present. For this purpose tertiary amines are particularly useful. These include pyridine, trimethyl amine, triethyl amine, and the like.

In most cases the reaction proceeds readily at low temperatures. The reaction rate can be raised by operating at higher temperatures. In general, a reaction temperature range of from about 0–200° C. is suitable. A preferred temperature range is from about 20–100° C.

The reaction is usually complete in about an hour, but varies with the reaction temperature and reactants. In general, reaction periods of from 1–8 hours give satisfactory results.

The following examples serve to illustrate the first method of preparing the new compounds of this invention. All parts are by weight unless otherwise specified.

EXAMPLE 1

In a reaction vessel equipped with stirrer, thermometer, heating and cooling means and provided with a nitrogen atmosphere place 2,000 parts of dioxane, 1,016 parts of 3,5-di-tert-butyl-4-hydroxybenzyl chloride, 142 parts of tetrakis(hydroxymethyl)phosphonium chloride and 400 parts of triethyl amine. Stir for 30 minutes and then warm the mixture to 50° C. Stir at 50–75° C. for 2 hours. Cool to 20° C. and filter off the precipitate. Wash the precipitate once with diethyl ether and then extract the product from the filter cake with hot chloroform. Evaporate the chloroform from the filtrate, leaving the solid product. Recrystallize the product from methanol, yielding tetrakis(3,5-di-tert-butyl-4-hydroxybenzyl)phosphonium chloride.

In the above example other hydroxybenzyl halides may be substituted to obtain the corresponding product. The following table lists various hydroxybenzyl halides and the product which would result from its substitution in the above example.

| Hydroxybenzyl halide | Product |
|---|---|
| 2-methyl-5-tert-butyl-4-hydroxybenzyl chloride. | Tetrakis(2-methyl-5-tert-butyl-4-hydroxybenzyl)phosphonium chloride. |
| 3,5-dicyclohexyl-4-hydroxybenzyl chloride. | Tetrakis(3,5-dicyclohexyl-4-hydroxybenzyl)phosphonium chloride. |
| 3-tert-butyl-2-hydroxybenzyl chloride. | Tetrakis(3-tert-butyl-2-hydroxybenzyl)phosphonium chloride. |
| 3-sec-dodecyl-5-methyl-2-hydroxybenzyl chloride. | Tetrakis(3-dodecyl-5-methyl-2-hydroxybenzyl)phosphonium chloride. |
| 3,5-di-sec-butyl-4-hydroxybenzyl chloride. | Tetrakis(3,5-di-sec-butyl-4-hydroxybenzyl)phosphonium chloride. |

Likewise, the corresponding phosphonium bromide product can be prepared following the above procedure by merely using the corresponding tetrakis-hydroxymethyl phosphonium bromide and hydroxybenzyl bromide as reactants. For example, the reaction of tetrakis(hydroxymethyl)phosphonium bromide with 3,5-di-tert-butyl-4-hydroxybenzyl bromide yields tetrakis(3,5-di-tert-butyl-4-hydroxybenzyl)phosphonium bromide.

In a similar manner, other tetrakis-hydroxyalkyl phosphonium chlorides can be substituted in the above Example 1 and the same product will be obtained. Furthermore, the reaction conditions can be varied within those previously described including the use of other solvents. If desired, the amine hydrogen halide acceptor can be omitted and the hydrogen halide removed from the product by use of an aqueous wash or vacuum.

A second method of preparing the tetrakis-hydroxybenzyl phosphonium halides is by the reaction of a hydroxybenzyl halide with a tris(hydroxyalkyl)phosphine oxide. The hydroxybenzyl halides are the same as those previously described for use in the first method of preparing the compounds of this invention. The tris(hydroxyalkyl)phosphine oxides are made from the previously-described tetrakis(hydroxyalkyl)phosphonium halides by reaction with lead carbonate (Filipescu et al., Canadian J. of Chem., vol. 41, pp. 821–5, 1963) or with sodium hydroxide, barium hydroxide or calcium carbonate (Hoffman, J. Am. Chem. Soc., 43, p. 1464, 1921, and Hoffman, J. Am. Chem. Soc., 52, p. 2995, 1930). The tris-hydroxyalkyl phosphine oxide used in the second method of making the tetrakis(hydroxybenzyl)phosphonium halides have the formula:

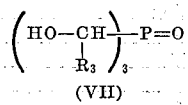

(VII)

wherein $R_3$ is selected from the group consisting of hydrogen and $C_{1-6}$ alkyl radicals. Examples of these reactants are:

tris(1-hydroxyethyl)phosphine oxide
tris(1-hydroxybutyl)phosphine oxide
tris(1-hydroxyamyl)phosphine oxide
tris(1-hydroxyheptyl)phosphine oxide The reaction is conducted in the same manner and under the same conditions as the previously-described reaction between hydroxybenzyl halides and tetrakis(hydroxyalkyl)phosphonium halides. The reactants are merely mixed together in a suitable solvent and warmed to the desired reaction temperature. As before, the reaction is preferably carried out in the presence of a hydrogen halide acceptor, although this is not critical.

The following examples illustrate the second method of preparing the new compounds of this invention.

EXAMPLE 2

In a reaction vessel as described in Example 1 was place 14 parts of tris(hydroxymethyl)phosphine oxide, 100 parts of dioxane and 30.5 parts of triethyl amine. While stirring, 76.5 parts of 3,5-di-tert-butyl-4-hydroxybenzyl chloride was added at 15–20° C. over a 30 minute period. Stirring was continued for one hour at 20–25° C. and the reaction mixture was then warmed to 50° C. It was stirred at 50–60° C. for another hour and then cooled to room temperature. The mixture was filtered and the filter cake was washed with ether to remove by-product. It was then extracted with chloroform to dissolve the product and the chloroform solution was filtered to remove insoluble material. The filtrate was evaporated, leaving 58.6 parts of a solid product. This product was recrystallized first from an acetone water mixture and then from a methanol water mixture, yielding tetrakis-(3,5-di-tert-butyl-4-hydroxybenzyl)phosphonium chloride.

EXAMPLE 3

In a reaction vessel place 106 parts of tris(1-hydroxyethyl)phosphine oxide, 2,500 parts of carbon tetrachloride and 1,600 parts of 3,5-di-($\alpha$-methylbenzyl)-4-hydroxybenzyl bromide. Stir the mixture an hour at 25–30° C. and then for 2 hours at 75–90° C. Water wash the resultant mixture and then evaporate off the solvent, leaving a solid product. Recrystallize the product from ethanol to obtain tetrakis[3,5-di-($\alpha$-methylbenzyl)-4-hydroxybenzyl]phosphonium bromide.

Following the above general procedure, variations may be made in the manner previously described for the first method of making the new compounds. Likewise, other reactants of the same type may be used with good results. For example, the following table lists the products that are obtained if different hydroxybenzyl halides are substituted.

| Hydroxybenzyl halide | Product |
|---|---|
| p-Hydroxybenzyl iodide | Tetrakis(4-hydroxybenzyl)phosphonium iodide. |
| 3,5-dimethyl-4-hydroxybenzyl chloride. | Tetrakis(3,5-dimethyl-4-hydroxybenzyl)phosphonium chloride. |
| 2-methyl-5-tert-butyl-4-hydroxybenzyl bromide. | Tetrakis(2-methyl-5-tert-butyl-4-hydroxybenzyl)phosphonium bromide. |
| 3,5-dicyclohexyl-4-hydroxybenzyl chloride. | Tetrakis(3,5-dicyclohexyl-4-hydroxybenzyl)phosphonium chloride. |
| 3-methyl-5-phenyl-2-hydroxybenzyl chloride. | Tetrakis(3-methyl-5-phenyl-2-hydroxybenzyl)phosphonium chloride. |

Likewise, the reaction may be conducted similar to above Example 3 but substituting different tris-hydroxyalkyl phosphine oxides. Surprisingly, this substitution leads to the same product obtained in Example 3.

In a third method of making the new compounds a hydroxybenzyl halide is reacted with a tris-hydroxyalkyl phosphine. Suitable hydroxybenzyl halides include all those shown as suitable in the first method described for making the new compounds. Suitable hydroxyalkyl phosphines are those having the formula:

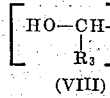

(VIII)

wherein $R_3$ is selected from the group consisting of hydrogen and $C_{1-6}$ alkyl radicals. These compounds are known and may be prepared by methods such as those disclosed by Grinshtein et al., Doklady Akad. Nauk. SSSR, vol. 138, pp. 1359–1362 (1961). Some examples of these materials are:

tris(hydroxymethyl)phosphine
tri(1-hydroxyethyl)phosphine
tris(1-hydroxybutyl)phosphine
tris(1-hydroxyheptyl)phosphine The process is conducted by merely reacting from about 4–6 mole parts of the hydroxybenzyl halide with one mole part of the tris(hydroxyalkyl)phosphine at a temperature of from about 0–200° C. The variable conditions such as temperature, solvents, reaction times, and the like, under which the process is carried out are the same as those described in the first method of making the new compounds.

The following examples serve to illustrate the third method of preparing the compounds of this invention.

EXAMPLE 4

In a reaction vessel as described in Example 1 place 62 parts of tris(hydroxymethyl)phosphine, 1,330 parts of 3,5-di-tert-butyl-4-hydroxybenzyl chloride, 2,500 parts of toluene and 320 parts of pyridine. Stir the mixture one hour at 25–30° C. and then heat to reflux. Reflux for one hour, cool to room temperature and then wash 3 times with water. Distill off about one-half of the toluene and then cool the reaction mixture, causing the product, tetrakis(3,5 - di - tert - butyl - 4 - hydroxybenzyl)phosphonium chloride, to precipitate. Other hydroxybenzyl halides can be used in the above example with good results. The following table lists hydroxybenzyl halides that can be used in the above example and the resultant product.

| Hydroxybenzyl halide | Product |
| --- | --- |
| 2-methyl-5-tert-butyl-4-hydroxybenzyl bromide. | Tetrakis(2-methyl-5-tert-butyl-4-hydroxybenzyl)phosphonium bromide. |
| 3,5-dimethyl-4-hydroxybenzyl iodide. | Tetrakis(3,5-dimethyl-4-hydroxybenzyl)phosphonium iodide. |
| 3-methyl-5-sec-dodecyl-2-hydroxybenzyl chloride. | Tetrakis(3-methyl-5-sec-dodecyl-2-hydroxybenzyl)phosphonium chloride. |
| 3-cyclohexyl-5-methyl-4-hydroxybenzyl chloride. | Tetrakis(3-cyclohexyl-5-methyl-2-hydroxybenzyl)phosphonium chloride. |
| 3-methyl-5-tert-butyl-4-hydroxybenzyl bromide. | Tetrakis(3-methyl-5-tert-butyl-4-hydroxybenzyl)phosphonium bromide. |

EXAMPLE 5

To a reaction vessel as described in Example 1 add 3,000 parts of diethyleneglycol dimethyl ether, 1,850 parts of 3,5-dicyclohexyl-4-hydroxybenzyl chloride and 352 parts of tris(1-hydroxyheptyl)phosphine. Stir the mixture one hour at 30° C. and then heat to reflux. Stir at reflux for an additional hour and then cool. Add 1,500 parts of water and filter off the precipitate. Recrystallize the precipitate from isopropanol to obtain tetrakis (3,5-dicyclohexyl-4-hydroxybenzyl)phosphonium chloride.

In the foregoing three processes, one reactant, the hydroxybenzyl halide, has been the same while the other reactant can be a tetrakis(1-hydroxyalkyl)phosphonium halide, a tris(1-hydroxyalkyl)phosphine, or a tris(1-hydroxyalkyl)phosphine oxide. It is apparent that mixtures of these phosphorus compounds can be reacted with the hydroxybenzyl halide in place of the individual compounds.

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, styrene-butadiene rubber (SBR), poly-chloroprene, chlorosulfonated polyethylene, fluorocarbon rubbers, isobutylene-isoprene (IIR), isoprene, poly-butadiene, nitrile-butadiene rubber, polyisobutylene rubber, polysulfide rubbers, silicone rubbers, urethanes, India rubber, reclaimed rubber, balata rubber, gutta percha rubber, and the like.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight homopolymers and copolymers of olefinically unsaturated monomers such as polyethylene and polypropyelne (both high pressure and so-called Ziegler type), polybutene, polybutadiene (both cis and trans), ethylene-propylene rubber, acrylonitrile-butadiene-styrene terpolymer, ethylene-propylene-diene terpolymers such as ethylene-propylene-1,5-cyclooctadiene and ethylene-propylene-dicyclopentadiene, and the like.

The amount of stabilizer used in the organic compositions of this invention is not critical as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 6

A rubber stock is prepared containing the following components:

| Component: | Parts |
| --- | --- |
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |

To the above base formula is added one part by weight of tetrakis - (3-tert-butyl-5-methyl-2-hydroxybenzyl)phosphonium bromide and, following this, individual samples are cured for 20, 30, 45 and 60 minutes, respectively, at 274° C. After cure, all of these samples remain white in color and possess excellent tensile strength. Furthermore, they are resistant to degradation caused by oxygen or ozone on aging.

EXAMPLE 7

A synthetic rubber master batch comprising 100 parts of SBR rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared.

To this is added 1.5 parts of tetrakis-(2-methyl-5-tert-butyl-4-hydroxybenzyl)phosphonium iodide. This composition is then cured for 60 minutes employing 45 p.s.i.g. of steam pressure. The resulting synthetic rubber possesses resistance to oxygen and ozone induced degradation.

EXAMPLE 8

A butadiene-acrylonitrile copolymer is prepared from 68 percent 1,3-butadiene and 32 percent acrylonitrile. Two percent, based on the weight of the copolymer, of tetrakis[3 - sec - dodecyl - 5(α - methylbenzyl) - 4 - hydroxybenzyl]phosphonium bromide is added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 9

Three percent of tetrakis(2-methyl-5-sec-butyl-4-hydroxybenzyl)phosphonium chloride as an emulsion in sodium oleate is added to a rubber-like copolymer of 1,3-butadiene and styrene containing 25 percent styrene. The resulting synthetic elastomer possesses enhanced stability.

EXAMPLE 10

To a master batch of GR–N synthetic rubber containing 100 parts of GR–N rubber, 5 parts of zinc stearate, 50 parts of carbon black, 5 parts of road tar, 2 parts of sulfur and 2 parts of mercaptobenzothiazole is added 5 percent, based on weight, of tetrakis(3-sec-decyl-5-benzyl-4-hydroxybenzyl)phosphonium chloride. After curing, a synthetic rubber is obtained of improved oxidative stability.

EXAMPLE 11

To a master batch of polyethylene having an average molecular weight of 1,000,000, a tensile strength of 6,700 p.s.i., a Shore D hardness of 74, and a softening temperature under low load of 150° C., is added 5 percent of tetrakis(3,5 - di - tert - butyl - 4 - hydroxybenzyl)phosphonium chloride. The resulting polyethylene possesses stability against oxidative degradation and shows no tendency to yellow after extensive aging.

EXAMPLE 12

A linear polyethylene having a high degree of crystallinity (93 percent) and less than one branched chain per 100 carbons atoms, a density of about 0.96 gram per ml. and which has about 1.5 double bonds per 100 carbon atoms, is mixed with 0.005 weight percent of tetrakis (3-tert-butyl-4-hydroxybenzyl)phosphonium chloride. The resulting polyethylene is found to possess stability against oxidative degradation.

EXAMPLE 13

To 100 parts of an ethylene-propylene terpolymer with 1,5-cyclooctadiene is added 3 parts of tetrakis(3-methyl-5-tert-butyl-4-hydroxybenzyl)phosphonium bromide, resulting in an ethylene-propylene terpolymer of enhanced stability.

EXAMPLE 14

To 100 parts of an ethylene-propylene rubber is added 2 parts of tetrakis[3-methyl-5(α,α-dimethylbenzyl)-4-hydroxybenzyl]phosphonium iodide, resulting in an EPR rubber stock of improved stability.

EXAMPLE 15

After the polymerization of polypropylene in a hexane solvent employing a Ziegler catalyst, the catalyst is neutralized with water and tetrakis(3-sec-dodecyl-4-hydroxybenzyl)phosphonium chloride is added to the mixture in quantities such that, after evaporation of the solvent, a Ziegler polypropylene is obtained containing 2 percent of tetrakis(3 - sec - dodecyl - 4 - hydroxybenzyl) - phosphonium chloride. This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 16

To 1,000 parts of a crystalline polypropylene prepared using a Ziegler type catalyst is added 1 weight percent of tetrakis(3 - methyl - 5 - tert - butyl - 4 - hydroxybenzyl) phosphonium chloride. The resulting mixture is melted and stirred, resulting in a molten polypropylene composition possessing excellent resistance to thermal degradation.

EXAMPLE 17

To 1,000 parts of poly-cis-butadiene dissolved in benzene is added 0.15 weight percent of tetrakis(3-cyclohexyl-2-hydroxy-benzyl)phosphonium bromide. The resultant poly-cis-butadiene solution is transferred slowly into boiling water, which causes the water and benzene to co-distill, leaving a stabilized poly-cis-butadiene.

EXAMPLE 18

To 1,000 parts of a crystalline polypropylene made using a Ziegler catalyst is added 1 weight percent of tetrakis[3 - tert - butyl - 5 - (α - methylbenzyl) - 4 - hydroxybenzyl]phosphonium bromide. The mixture is melted and immediately stirred, giving a highly stable polypropylene.

EXAMPLE 19

To 1,000 parts of solvent-refined midcontinent neutral lubricating oil containing 0.05 percent zinc-dilaurylthiophosphate, 4 percent of a poly-laurylmethacrylate VI Improver and 0.05 percent of an overbased calcium sulfonate and 2 percent of a dispersant formed by reacting an alkenyl succinic anhydride wherein the alkenyl chain is a polybutene with a molecular weight of about 1,000 with tetraethylene pentamine is added 0.05 percent of tetrakis(3,5 - di - sec - butyl - 4 - hydroxybenzyl)phosphonium chloride. The resulting oil is resistant to thermal and oxidant deterioration.

EXAMPLE 20

To 1,000 parts of an acrylonitrile-styrene-butadiene resin (ABS resin) is added 10 parts of carbon black and 5 parts of tetrakis[3,5-di-(α-methylbenzyl)-4-hydroxybenzyl]phosphonium chloride. The mixture is blended in a Banbury mixer, resulting in a highly stable ABS resin.

EXAMPLE 21

To 1,000 parts of a gasoline containing 26.6 percent aromatics, 20.8 percent olefins, 52.6 percent saturates and having an API gravity of 62.1 is added 10 parts of tetrakis(3,5 - di - sec - dodecyl - 4 - hydroxybenzyl)phosphonium bromide. The resulting gasoline is stable.

EXAMPLE 22

To 10,000 parts of gasoline containing 8.6 percent aromatics, 7.9 percent olefins, 83.5 percent saturates and having an API gravity of 68.5 is added 75 parts of tetrakis(3,5 - dicyclohexyl - 4 - hydroxybenzyl)phosphonium bromide. The resulting gasoline is stable against oxidative degradation.

EXAMPLE 23

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 50 parts of tetrakis(3,5-di-tert-octyl-4-hydroxybenzyl)phosphonium chloride. The resulting gasoline containing a manganese antiknock was resistant to oxidative degradation.

EXAMPLE 24

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of tetrakis(3,5 - di - tert - amyl - 4 - hydroxybenzyl)phosphonium chloride. The resulting gasoline containing a lead antiknock and halogen scavenger is resistant to oxidative degradation.

EXAMPLE 25

An antiknock fluid composition is prepared by mixing together 61.5 parts of tetraethyllead, 17.9 parts of ethylenedibromide, 18.8 parts of ethylenedichloride and 1.3 parts of tetrakis(3,5-di-tert-amyl-4-hydroxybenzyl)phosphonium chloride, resulting in a stable antiknock fluid composition.

EXAMPLE 26

To 1,000 parts of a commercial diesel fuel having a cetane number of 42 is added 5 parts of amyl nitrate and 4 parts of tetrakis(3,5-diisopropyl-4-hydroxybenzyl)phosphonium iodide, resulting in a diesel fuel of high resistance to oxidative deterioration which does not form gum or sludge on storage.

EXAMPLE 27

To 1,000 parts of a solvent-refined neutral oil (95 viscosity index and 200 SUS at 100° F.) containing 6 percent of a commercial methacrylate VI Improver is added 5 percent of tetrakis(3,5-di-tert-butyl-4-hydroxybenzyl)phosphonium chloride, resulting in a stable lubricating oil.

EXAMPLE 28

To a solvent-refined crankcase lubricating oil having a viscosity index of 95 and a SAE viscosity of 10 is added 0.1 percent of tetrakis[3,5-di-($\alpha$-methylbenzyl)-4-hydroxybenzyl]phosphonium chloride. The resulting oil was stable against oxidative degradation.

EXAMPLE 29

To 100,000 parts of a petroleum hydrocarbon oil having a gravity of 30.3° API at 60° F., viscosity of 178.8 SUS at 100° F., a viscosity index of 154.2, and containing 1,000 parts of the reaction product of an alkenyl succinic anhydride where the alkenyl group has a molecular weight of 2,000, with a polyethylene amine, is added 200 parts of tetrakis (3,5-di-sec-dodecyl-4-hydroxybenzyl)-phosphonium bromide. The resulting lubricating oil possesses excellent dispersancy and is resistant to oxidative degradation.

EXAMPLE 30

To 100,000 parts of a commercially available pentaerythritol ester having a viscosity at 100° F. of 22.4 centistokes and known under the tradename of "Hercoflex 600" is added 400 parts of tetrakis(3,5-di-tert-butyl-4-hydroxybenzyl)phosphonium chloride. The resulting synthetic lubricating oil possesses improved resistance against oxidative deterioration.

EXAMPLE 31

To 100,000 parts of dioctyl sebacate having a viscosity at 210° F. of 36.7 SUS, a viscosity index of 159, and a molecular weight of 427 is added 250 parts of tetrakis (3-tert-butyl-5-benzyl - 4 - hydroxybenzyl)phosphonium iodide, resulting in a synthetic diester lubricating oil having improved resistance to oxidative degradation.

EXAMPLE 32

To 1,000 parts of a commercial coconut oil is added 5 parts of tetrakis(3,5-diisopropyl-4-hydroxybenzyl)phosphonium iodide, resulting in a vegetable oil with good aging characteristics.

EXAMPLE 33

To 100,000 parts of lard is added 100 parts of tetrakis-(3,5 - dicyclohexyl-4-hydroxybenzyl)phosphonium bromide resulting in a lard having resistance to rancidity.

The stabilizing additives of this invention are eminently useful as stabilizers in homopolymers and copolymers of ethylenically unsaturated monomers such as polyethylene, polypropylene, and the like. In this use they function as antioxidants and also as thermal stabilizers. They are extremely long lasting and highly resistant to the formation of color.

In order to demonstrate their superior stabilization effect tests were conducted using a commercial polypropylene. These tests are known as "Oven Aging Tests" and are recognized in the plastic industry as an accurate guide to oxidative stability. In these tests small specimens of polypropylene are prepared containing the test stabilizer. These test specimens are placed in an air circulating oven maintained at 150° C. Five replicates are made of each polypropylene-stabilizer composition and the test criteria is the time in hours until three of the five replicates show signs of deterioration. Deterioration is evidenced by cracking, discoloration or any visual appearance of change in the specimen.

Test specimens are prepared by mixing the test stabilizers with polypropylene powder for three minutes in a Waring Blendor. The mixture is then molded into a 6" x 6" sheet with a thickness of 0.025" (25 mils). This is accomplished in a molding press at 400° F. under 5,000 p.s.i. pressure. Each sheet is then cut into ½" x 1" test specimens in order to obtain the five replicate samples. These samples are then subjected to the Oven Aging Tests.

The results obtained are shown in the following table.

| Additive | Conc. (wt. percent) | Sample thickness (mil) | Hours to failure |
|---|---|---|---|
| None | | 25 | 2.5 |
| Tetrakis(3,5-di-tert-butyl-4-hydroxybenzyl)phosphonium chloride | 0.3 | 25 | 568 |

The effectiveness of the present stabilizers can be enhanced still further by employing synergistic mixtures of the stabilizers of this invention. The preferred synergists are compounds having the formula:

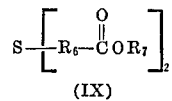

(IX)

wherein $R_6$ is a divalent hydrocarbon radical containing from 1 to about 6 carbon atoms and $R_7$ is an alkyl radical containing from 6 to about 20 carbon atoms. Some examples of synergists are dilaurylthiodipropionate, diamylthiodiacetate, $\beta,\beta'$-thiobis(cetylbutyrate), dieicosylthiodiheptoate, dicetylthiodipropionate, dibenzylthiodibutyrate, didecylthiodipropionate, dihexylthiodiacetate, and the like. Preferred synergists are represented by Formula IX wherein $R_6$ contains from 1–3 carbon atoms and $R_7$ is an alkyl radical containing from 10 to about 18 carbon atoms. The most preferred synergists are dilaurylthiodipropionate and distearylthiodipropionate.

The ratio of synergist to stabilizing compound should be adjusted to give the desired protection at the least cost. Mixtures containing from 1 percent synergist and 99 percent stabilizer to those containing 99 percent synergist and 1 percent stabilizer can be employed. A more useful range is from 10–90 percent. Best results are usually obtained with stabilizing mixtures containing from 50 to 66 percent synergist and from 34 to 50 percent stabilizing compound.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed. This was demonstrated by the previously described Oven Aging Test carried out on polypropylene in which an additive of the present invention was synergized with DLTDP. The results obtained were as follows

| Additive | Conc. (wt. percent) | Hours to failure |
| --- | --- | --- |
| None | 0 | 2.5 |
| DLTDP | 0.3 | 288 |
| Tetrakis-(3,5-di-tert-butyl-4-hydroxybenzyl)phosphonium chloride | 0.3 | 568 |
| Tetrakis-(3,5-di-tert-butyl-4-hydroxybenzyl)phosphonium chloride Plus DLTDP | 0.1 0.2 | }1072 |

The following table lists some useful synergistic combinations.

(1)
66%—dilaurylthiodipropionate
34%—tetrakis(3,4-di-tert-butyl-4-hydroxybenzyl)phosphonium chloride (2)
90%—dicetylthiodipropionate
10%—tetrakis(3,5-di-tert-amyl-4-hydroxybenzyl)phosphonium chloride (3)
10%—diamylthiodiacetate
90%—tetrakis(3,5-di-tert-octyl-4-hydroxybenzyl)phosphonium chloride (4)
50%—dioctadecylthiodipropionate
50%—tetrakis(3-tert-butyl-5-benzyl-4-hydroxybenzyl) phosphonium iodide The above synergistic combinations are useful in any of the previously-described organic materials. The organic compositions are prepared as shown in the previous examples 6 to 33 by merely adding the synergistic combination in place of the antioxidant compound or by separately adding the synergist to the organic compositions in addition to the antioxidant compound.

I claim:

1. A tetrakis(hydroxybenzyl)phosphonium halide having the formula:

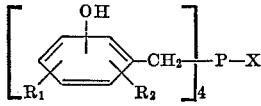

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals, $C_{7-12}$ aralkyl radicals, and X is a halogen having an atomic number from 17–53.

2. A compound of claim 1 having the formula:

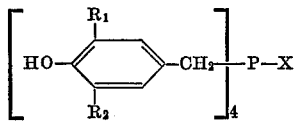

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals, $C_{7-12}$ aralkyl radicals, and X is a halogen having an atomic number from 17–53.

3. The compound of claim 2 wherein $R_1$ and $R_2$ are tert-butyl radicals and X is chlorine.

4. A process for preparing a compound of claim 1, said process comprising reacting about 4–6 mole parts of a hydroxybenzyl halide having the formula:

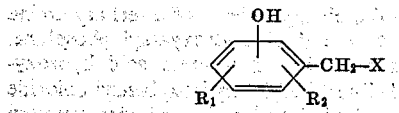

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals, $C_{7-12}$ aralkyl radicals, and X is a halogen having an atomic number from 17–53, with one mole part of a tris-hydroxyalkyl phosphine oxide having the formula:

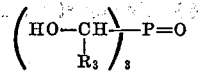

wherein $R_3$ is selected from the group consisting of hydrogen and $C_{1-6}$ alkyl radicals, at a temperature of from about 0–200° C.

5. The process of claim 4 carried out in the presence of from about 2 to 4 mole equivalents of a tertiary amine per mole equivalent of said tris-hydroxyalkyl phosphine oxide.

6. The process of claim 5 wherein said hydroxybenzyl halide is 3,5-di-tert-butyl-4-hydroxybenzyl chloride and said tris-hydroxyalkyl phosphine oxide is tris(hydroxymethyl)phosphine oxide.

7. A process of preparing a compound of claim 1, said process comprising reacting about 4–6 mole parts of a hydroxybenzyl halide having the formula:

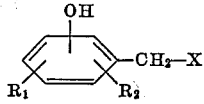

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals, $C_{7-12}$ aralkyl radicals, and X is a halogen having an atomic number from 17–53, with one mole part of a tetrakis hydroxyalkyl phosphonium halide having the formula:

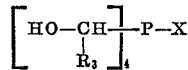

wherein $R_3$ is selected from the group consisting of hydrogen and $C_{1-6}$ alkyl radicals, and X is a halogen having an atomic number from 17–53, at a temperature of from about 0–200° C.

8. The process of claim 7 carried out in the presence of from about 2 to 4 mole equivalents of a tertiary amine per mole equivalent of said tetrakis-hydroxyalkyl phosphonium halide.

9. The process of claim 8 wherein said hydroxybenzyl halide is 3,5-di-tert-butyl-4-hydroxybenzyl chloride and said tetrakis hydroxyalkyl phosphonium halide is tetrakishydroxymethyl phosphonium chloride.

10. A process for preparing a compound of claim 1, said process comprising reacting about 4–6 mole parts of a hydroxybenzyl halide having the formula:

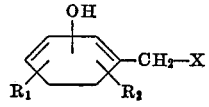

wherein $R_1$ and $R_2$ are independently selected from the group consisting of hydrogen, $C_{1-12}$ alkyl radicals, $C_{6-12}$ aryl radicals, $C_{6-12}$ cycloalkyl radicals, $C_{7-12}$ aralkyl radicals, and X is a halogen having an atomic number from 17–53, with one mole part of a tris-hydroxyalkyl phosphine having the formula:

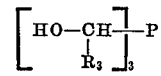

wherein $R_3$ is selected from the group consisting of hydrogen and $C_{1-6}$ alkyl radicals, at a temperature of from about 0-200° C.

11. The process of claim 10 carried out in the presence of from about 2 to 4 mole equivalents of a tertiary amine per mole equivalent of said tris-hydroxyalkyl phosphine.

12. The process of claim 11 wherein said hydroxybenzyl halide is 3,5-di-tert-butyl-4-hydroxybenzyl chloride and said tris-hydroxyalkyl phosphine is tris-hydroxymethyl phosphine.

References Cited

UNITED STATES PATENTS

| | | | |
|---|---|---|---|
| 2,862,970 | 12/1958 | Thielen | 260—606.5 |
| 2,946,824 | 7/1960 | Chiddix et al. | 260—606.5 |
| 2,937,207 | 5/1960 | Reuter et al. | 260—606.5 |
| 3,146,212 | 8/1964 | Wagner et al. | 260—606.5 X |
| 3,213,057 | 10/1965 | Ritt et al. | 260—606.5 X |
| 3,221,057 | 11/1965 | Gordon et al. | 260—606.5 |
| 3,230,069 | 1/1966 | Preston | 260—606.5 X |
| 3,333,005 | 7/1967 | Grayson et al. | 260—606.5 |
| 3,257,460 | 6/1966 | Gordon et al. | 260—606.5 |
| 3,248,429 | 4/1966 | Baranauckas et al. | 260—606.5 |
| 3,422,149 | 1/1969 | Rauhut et al. | 260—606.5 |

TOBIAS E. LEVOW, Primary Examiner

W. F. W. BELLAMY, Assistant Examiner

U.S. Cl. X.R.

252—386, 399; 260—45.85

UNITED STATES PATENT OFFICE
CERTIFICATE OF CORRECTION

Patent No. 3,483,260  Dated December 9, 1969

Inventor(s) Calvin J. Worrel

It is certified that error appears in the above-identified patent and that said Letters Patent are hereby corrected as shown below:

Column 2, in Formula (III), that portion of the formula reading

   should read   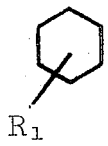

Column 6, line 63, in Formula (VIII), insert "$_3$" after the bracket; line 69, "vol. 138" should read -- Vol. 139 --. Column 13, line 24, "tetrakis(3,4-di-" should read -- tetrakis-(3,5-di- --. Column 14, Claim 10, in the formula, that portion of the formula reading

   should read   

SIGNED AND SEALED

JUN 9 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,483,260        Dated December 9, 1969

Inventor(s) Calvin J. Worrel

It is certified that error appears in the above-identified patent and that said Letters Patent are hereby corrected as shown below:

Column 2, in Formula (III), that portion of the formula reading

         should read         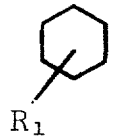

Column 6, line 63, in Formula (VIII), insert "$_3$" after the bracket; line 69, "vol. 138" should read -- Vol. 139 --. Column 13, line 24, "tetrakis(3,4-di-" should read -- tetrakis (3,5-di- --. Column 14, Claim 10, in the formula, that portion of the formula reading

         should read         

SIGNED AND
SEALED
JUN 9 1970

(SEAL)
Attest:

Edward M. Fletcher, Jr.
Attesting Officer

WILLIAM E. SCHUYLER, JR.
Commissioner of Patents